No. 763,245. PATENTED JUNE 21, 1904.
E. BEBLER & N. F. ANDERSON.
HOLDING DEVICE FOR INSULATOR OR OTHER BOLTS.
APPLICATION FILED OCT. 1, 1903.
NO MODEL.
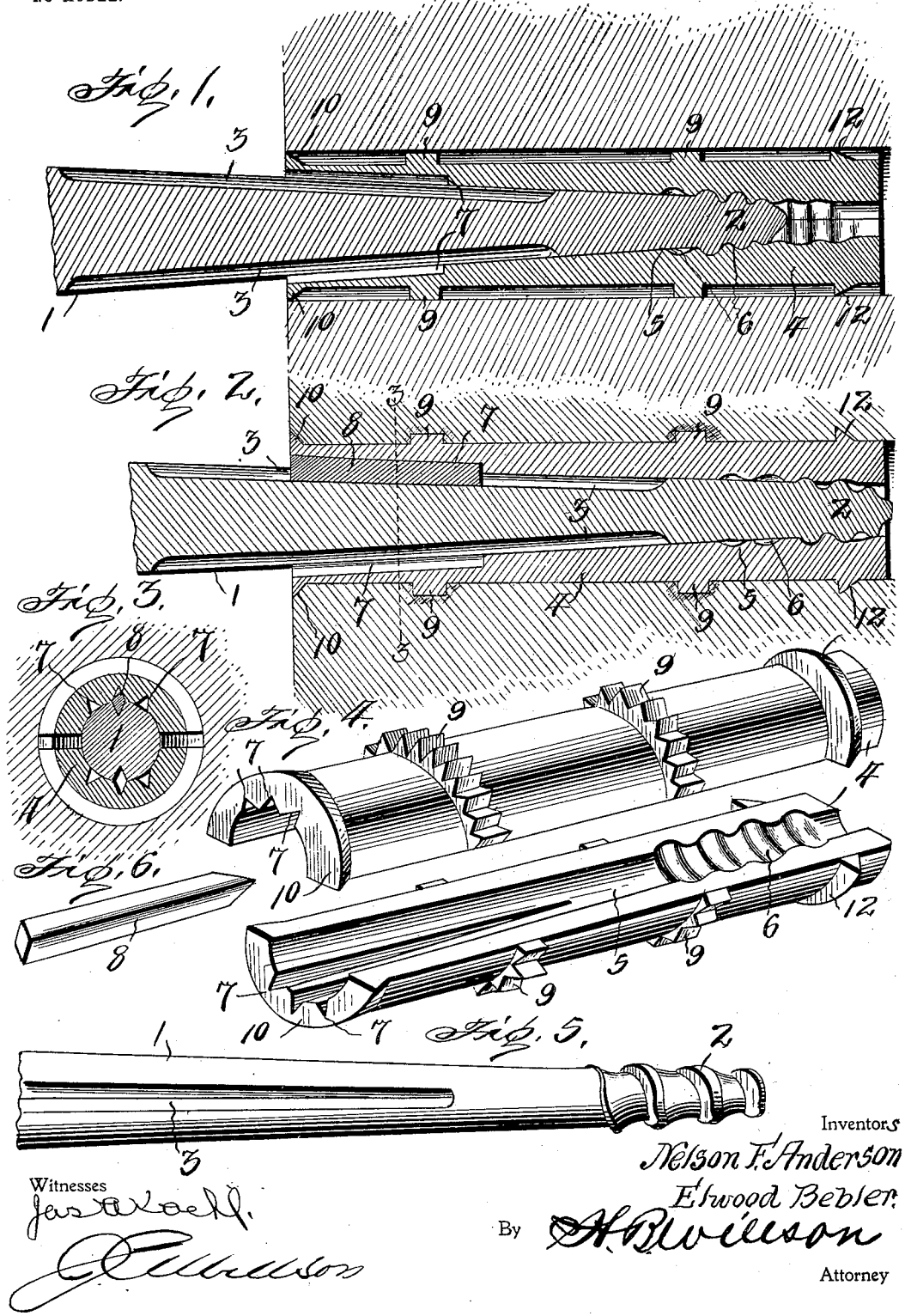
Witnesses
Inventors
Nelson F. Anderson
Elwood Bebler
By H. B. Willson
Attorney No. 763,245. Patented June 21, 1904.

UNITED STATES PATENT OFFICE.

ELWOOD BEBLER AND NELSON F. ANDERSON, OF LOS ANGELES, CALIFORNIA.

HOLDING DEVICE FOR INSULATOR OR OTHER BOLTS.

SPECIFICATION forming part of Letters Patent No. 763,245, dated June 21, 1904.

Application filed October 1, 1903. Serial No. 175,381. (No model.)

*To all whom it may concern:*

Be it known that we, ELWOOD BEBLER and NELSON F. ANDERSON, citizens of the United States, residing at Los Angeles, in the county of Los Angeles and State of California, have invented certain new and useful Improvements in Holding Devices for Insulator or other Bolts; and we do declare the following to be a full, clear, and exact description of the invention, such as will enable others skilled in the art to which it appertains to make and use the same.

This invention relates to improvements in devices for holding insulator or other supporting bolts or shanks in place.

The object of the invention is to provide a device of this character which will securely hold such supporting-bolts in place and at the same time protect them and permit the removal thereof when desired.

Another object is to provide means to prevent the turning of the bolts in said holding devices.

With these and other objects in view the invention consists of certain novel features of construction, combination, and arrangement of parts, as will be more fully described, and particularly pointed out in the appended claim.

In the accompanying drawings, Figure 1 is a longitudinal sectional view of the holding device, showing the position of the parts before the bolt is tightened up. Fig. 2 is a similar view showing the position of the parts after the bolt has been screwed into the holder and locked in place. Fig. 3 is a cross-sectional view on the line 3 3 of Fig. 2. Fig. 4 is a detail perspective view of the holder, showing the parts of the same separated. Fig. 5 is a side view of the bolt, and Fig. 6 is a detail perspective view of the locking-key.

Referring more particularly to the drawings, 1 denotes a smooth tapering shank or bolt having formed on its smaller end a short section of coarse screw-threads 2.

3 denotes longitudinally-disposed grooves formed in the shank, said grooves being preferably V shape and arranged at diametrically opposite points in the sides of said shank and extending from the head end to within a short distance of the threaded end of the same. The larger end of said shank or bolt may be provided with any suitable form of supporting-head. (Not shown.)

4 denotes a cylindrical sleeve or socket having a tapering bore 5, said sleeve or socket being divided longitudinally to form two semi-cylindrical halves or sections. The bore in each of said halves or sections is formed for a short distance at its smaller end with coarse screw-threads 6, which when said halves or sections are placed together coincide and form a continuous threaded surface at said end for the reception of the threads 2 on the smaller end of the bolt or shank 1.

7 denotes longitudinally-disposed grooves formed in the walls of the bore 5 of the socket members, there being preferably three or more of said grooves arranged as shown in the drawings, so that when the shank or bolt 1 is screwed into said socket the grooves 3 in the same will be brought into alinement with one of the grooves 7 in said bore. When in this position, a locking-key 8 is inserted, which will prevent the rotation of said shank or bolt, and thereby prevent the withdrawal of the same from the socket until the key is removed. The key 8 is of the same shape as and occupies the space formed by the alined grooves of the bolt and socket.

Each half or section of the socket is provided on its exterior surface with one or more series of radially-disposed triangularly-shaped teeth or prongs 9, arranged in annular series around the curved sides of said halves, as shown. Each half or section is further provided at its inner end with an annularly-arranged flange or shoulder 10, and at its outer end is formed an annular flange or enlargement 12. These flanges or portions 10 and 12 are beveled or otherwise shaped to form penetrating members, which with the rows of teeth 9 are forced into the wall of the hole or opening in which the socket is inserted, as shown in Fig. 2, and thereby act to hold the socket against casual longitudinal or axial motion.

In the application of the device a hole is formed in the object to which the bolt is to be attached, said hole being of such diameter as to just admit the cylindrical socket when the halves or sections of the same are in close engagement. After inserting the socket in said hole the shank is inserted in the bore of the socket until the threaded ends of the same engage the threads in said bore, when the shank or bolt is turned or screwed farther into the socket, which owing to the tapering formation of the shank or bolt and the bore of the socket will cause the halves or sections of the same to separate or spread apart, thereby forcing the teeth and flanges of said socket into the walls of the hole in which said socket is inserted, as shown in Fig. 2, thereby securely holding the socket or sleeve in place and preventing the withdrawal of the bolt or shank from the socket except by unscrewing the same.

In order that the bolt or shank will not become accidentally unscrewed, the key 8 is driven into the space formed by the coinciding grooves of the shank and bore, as hereinbefore described.

It will be observed that the grooves 7 of the socket are longitudinally tapered—that is, that they diminish in depth from their outer to their inner ends, and at the latter point merge into the face of the internal wall of the socket—and, further, that the key 8 is cross-sectionally of diamond form and similarly tapered. By this construction the key when applied exerts a wedging action, thus forcing the outer row of teeth 9 and outer penetrating-flange 10 more firmly into the wall of the socket and itself binds more securely against the wall of the socket, whereby it is retained effectually against disengagement. Owing to the tapered formation of the grooves 7, whose deeper ends are at the outer end of the socket, the strength of the socket would be impaired at that point were it not for the provision of the flange 10, which gives the required thickness for the formation of grooves of a desired depth without weakening the socket and at the same time operates as a penetrating-flange to supplement the holding action of the teeth 9, as hereinbefore stated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim, and desire to secure by Letters Patent, is—

A holding device of the character described, comprising a sectional socket having internal screw-threads at its inner end, tapering longitudinal grooves at its outer end deepest at their outer ends, and external penetrating devices, one of said penetrating devices consisting of an annular flange increasing the diameter of the socket at the deep ends of the grooves, a tapered shank adapted to be inserted in said socket and having a screw-threaded portion to engage the screw-threads of the socket and longitudinal grooves to coincide with the grooves in the socket, and a tapered key adapted to be driven into matching grooves of the shank and socket and supplement the expanding action of the same on the parts of the socket, substantially as described.

In testimony whereof we have hereunto set our hands in presence of two subscribing witnesses.

ELWOOD BEBLER.
NELSON F. ANDERSON.

Witnesses:
F. M. STAPLES,
R. E. MUNCY.